US006262765B1

(12) United States Patent
Jeong

(10) Patent No.: US 6,262,765 B1
(45) Date of Patent: Jul. 17, 2001

(54) AUTOMATIC PICTURE ADJUSTMENT SYSTEM FOR MONITOR

(75) Inventor: Gab Yeon Jeong, Kyoungsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/914,901

(22) Filed: Aug. 20, 1997

(51) Int. Cl.[7] .................................................. H04N 5/44
(52) U.S. Cl. ...................... 348/180; 348/561; 348/511; 345/132; 345/127
(58) Field of Search .................................. 348/552, 554, 348/555, 556, 558, 561, 581, 180, 511, 655, 776, 181, 190, 510, 512; 345/3, 127, 132; H04N 5/44, 5/455, 5/46, 9/13

(56) References Cited

U.S. PATENT DOCUMENTS

| | | | |
|---|---|---|---|
| 5,258,828 | * 11/1993 | Sano | 348/776 |
| 5,400,086 | * 3/1995 | Sano | 348/655 |
| 5,457,473 | * 10/1995 | Arai | 345/10 |
| 5,602,567 | * 2/1997 | Kanno | 345/132 |
| 5,654,743 | * 8/1997 | Hu | 345/213 |
| 5,684,714 | * 11/1997 | Yogeshwar | 348/420 |
| 5,713,040 | * 1/1998 | Lee | 345/132 |
| 5,764,302 | * 6/1998 | Park | 348/542 |
| 5,771,029 | * 6/1998 | Park | 345/10 |
| 5,801,767 | * 9/1998 | Wu | 348/511 |

* cited by examiner

Primary Examiner—Mark R. Powell
Assistant Examiner—Wesner Sajous
(74) Attorney, Agent, or Firm—Oppenheimer Wolff & Donnelly LLP

(57) ABSTRACT

An automatic picture adjustment system for a monitor connected to a personal computer (PC), capable of automatically performing the picture adjustment such as adjustment of the horizontal or vertical position and size of the picture, compensation for the side pincushion and trapezoidal distortion, etc., without employing a separate picture adjustment equipment. The picture adjustment system includes a timing information providing section provided in the PC for providing timing information for the picture adjustment of the monitor, a computation control section provided in the monitor for computing a picture adjustment value of the monitor utilizing the timing information, and a conversion driving section for converting the computed picture adjustment into a DC picture adjustment signal and for driving the monitor in accordance with the picture adjustment signal to display on a screen of the monitor a picture adjusted with the picture adjustment value. The picture adjustment system may also include a key input section for a user's input of the picture adjustment value according to the user's preference.

16 Claims, 5 Drawing Sheets

AUTOMATIC PICTURE ADJUSTMENT SYSTEM FOR MONITOR

BACKGROUND OF THE INVENTION

1. Field of the Invention

The present invention relates to an automatic picture adjustment of a monitor, and more particularly to an automatic picture adjustment system for a monitor which can automatically perform the picture adjustment such as adjustment of horizontal or vertical position and size of the picture, compensation for a side pincushion and trapezoidal distortion, etc.

2. Description of the Related Art

Generally, in the manufacturing process of a video display appliance such as a monitor, one step for an automatic picture adjustment mode is performed. A conventional picture adjustment device for a monitor includes a personal computer (PC) 1, a monitor 2, and an adjustment equipment 3 which are connected together. The picture adjustment method performed utilizing the conventional picture adjustment device as constructed above will now be explained with reference to FIGS. 1 to 3.

In a state that the adjustment value of the horizontal or vertical position and size of the picture, and the compensation value of the side pincushion and trapezoidal distortion have been predetermined and stored in the PC 1, image information, which is displayed on a screen of the monitor 2 as shown in FIG. 3, is obtained by a video camera 3a mounted on the adjustment equipment 3. The value H1–H7, and V1–V3 of the horizontal and vertical position and size of the image information which is obtained by the adjustment equipment 3 is transmitted to the PC 1, so that the PC 1 compares the obtained value with a predetermined value. If the two values are identical to each other as a result of comparison, the obtained value is stored in a microcomputer (in detail, in an electrically, erasable and programmable read only memory (EEPROM)) 2a of the monitor 2, while if the two values are not identical to each other, the adjustment is performed by continuously increasing or decreasing the inputted value until it becomes identical to the predetermined value in the PC 1.

If the adjustment of one mode is completed as described above, the adjustment of another mode is then performed in the same manner. The adjusted data values, which are obtained by the above described adjustment operation, are stored in the EEPROM 2a, while the data communication between the PC 1 and the monitor 2 is performed utilizing an RS-232C interface.

The conventional picture adjustment device for a monitor as described above, however, has the drawback in that a lot of time is required for adjusting all the modes, and thus the productivity of the monitor decreases, causing the manufacturing cost thereof to increase, since the adjustment value for each mode, such as the value of the horizontal or vertical position and size, and the compensated value of the side pincushion and trapezoidal distortion, are stored in the EEPROM built in the microcomputer of the monitor, and thereafter, if a mode is selected, the value corresponding to the selected mode is read out from the EEPROM to display the picture adjusted by the selected mode on the screen.

SUMMARY OF THE INVENTION

It is an object of the present invention to provide an automatic picture adjustment system for a monitor which can automate the picture adjustment of the monitor by reading out timing information for the picture adjustment from a PC, computing the picture adjustment value, and then displaying the adjusted picture on the screen of the monitor.

It is another object of the present invention to provide an automatic picture adjustment system for a monitor whereby a user can adjust the picture according to his/her preference using an adjustment key, providing convenience in picture adjustment.

In order to achieve the above objects, there is provided an automatic picture adjustment system for adjusting the picture state of a monitor which is in communication with a PC. The system includes means, provided in the PC, for providing timing information for the picture adjustment of the monitor; computation control means, provided in the monitor, for computing a picture adjustment value of the monitor utilizing the timing information provided from the timing information providing means; and conversion driving means, provided in the monitor, for converting the picture adjustment value computed by the computation control means into a picture adjustment signal, and for driving the monitor in accordance with the picture adjustment signal to display on a screen of the monitor a picture adjusted with the picture adjustment value.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Figure 1:
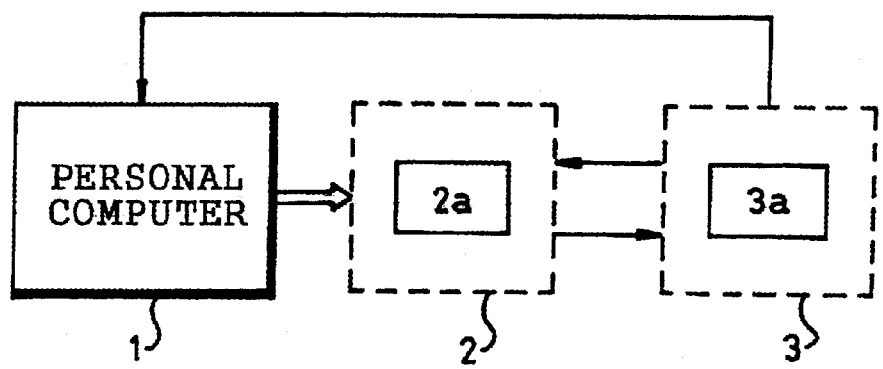
FIG. 1 is a block diagram of a conventional picture adjustment device for a monitor.
Figure 2:
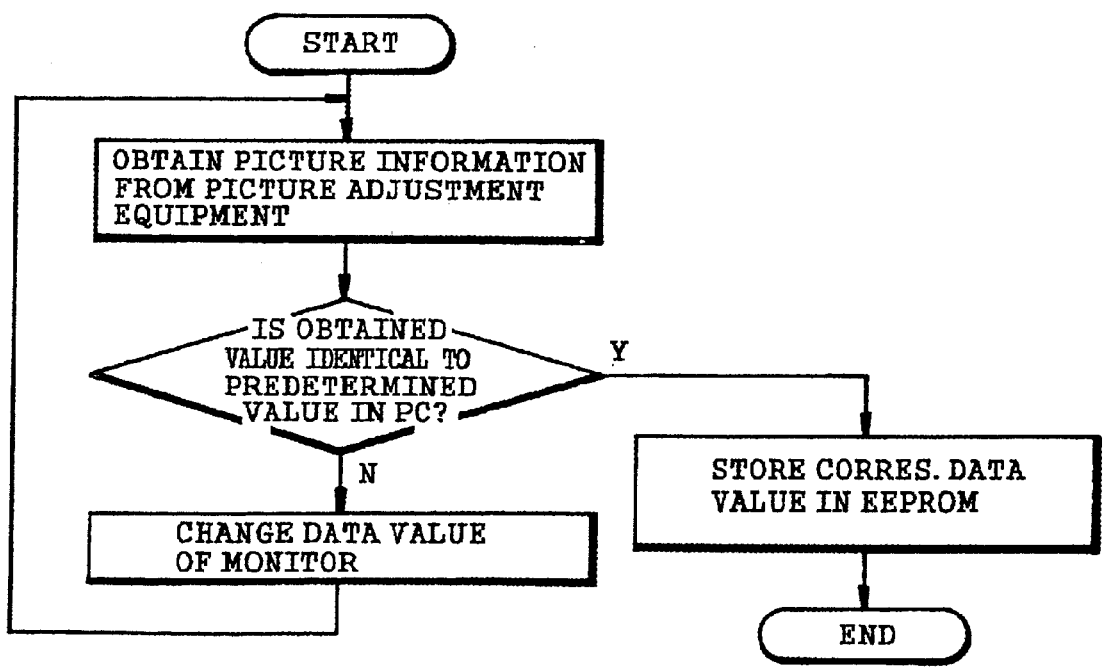
FIG. 2 is a flow chart explaining the picture adjustment performed by the conventional picture adjustment device of FIG. 1.
Figure 3:
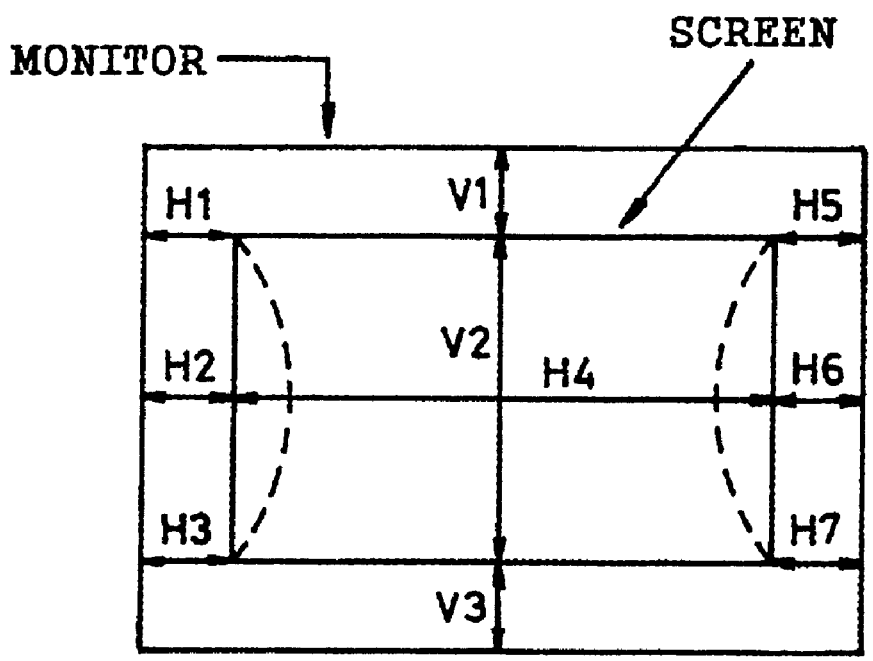
FIG. 3 is a view illustrating the picture adjustment state displayed on the screen by the conventional picture adjustment device.
Figure 4:
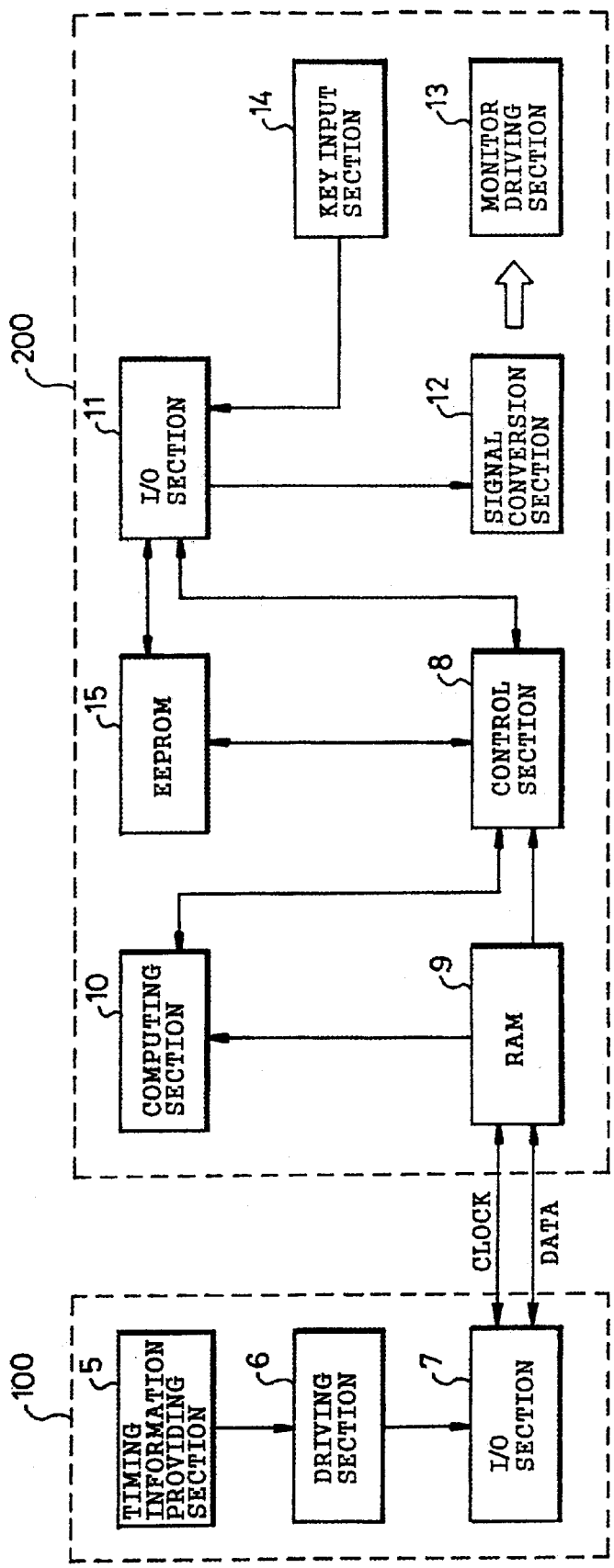
FIG. 4 is a block diagram of the picture adjustment system for a monitor according to the present invention.

FIG. 4 is a block diagram of the picture adjustment system for a monitor according to the present invention.

Referring to FIG. 4, the picture adjustment system according to the present invention includes a timing information providing section 5 for providing predetermined timing information for the picture adjustment of the monitor when the monitor 200 is connected to the PC 100, a driving section 6 for driving the timing information providing section 5, and a PC-side input/output (I/O) section 7 for transmitting the timing information outputted from the timing information providing section 5 to the monitor 200.

The picture adjustment system according to the present invention further includes a control section 8 for controlling the picture adjustment of the monitor, a first memory 9 for storing the timing information inputted from the PC-side I/O section 7, a computing section 10 for computing a picture adjustment value of the monitor under the control of the control section 8 utilizing the timing information stored in the first memory 9, a monitor-side I/O section 11 for inputting/outputting the computed picture adjustment value under the control of the control section 8, a signal conversion section 12 for converting the picture adjustment value inputted through the I/O section 11 into a picture adjustment signal for driving the monitor, a monitor driving section 13 for driving a cathode ray tube (CRT) of the monitor in accordance with the picture adjustment signal outputted from the signal conversion section 13, a key input section 14, connected to the I/O section 11, for the user's input of the picture adjustment value, and a second memory 15 for storing the picture adjustment value inputted through the key input section 14 under the control of the control section 8.

The operation of the picture adjustment system according to the present invention as constructed above will now be explained with reference to FIGS. 4, 5, 6A, and 6B.

Figure 5:
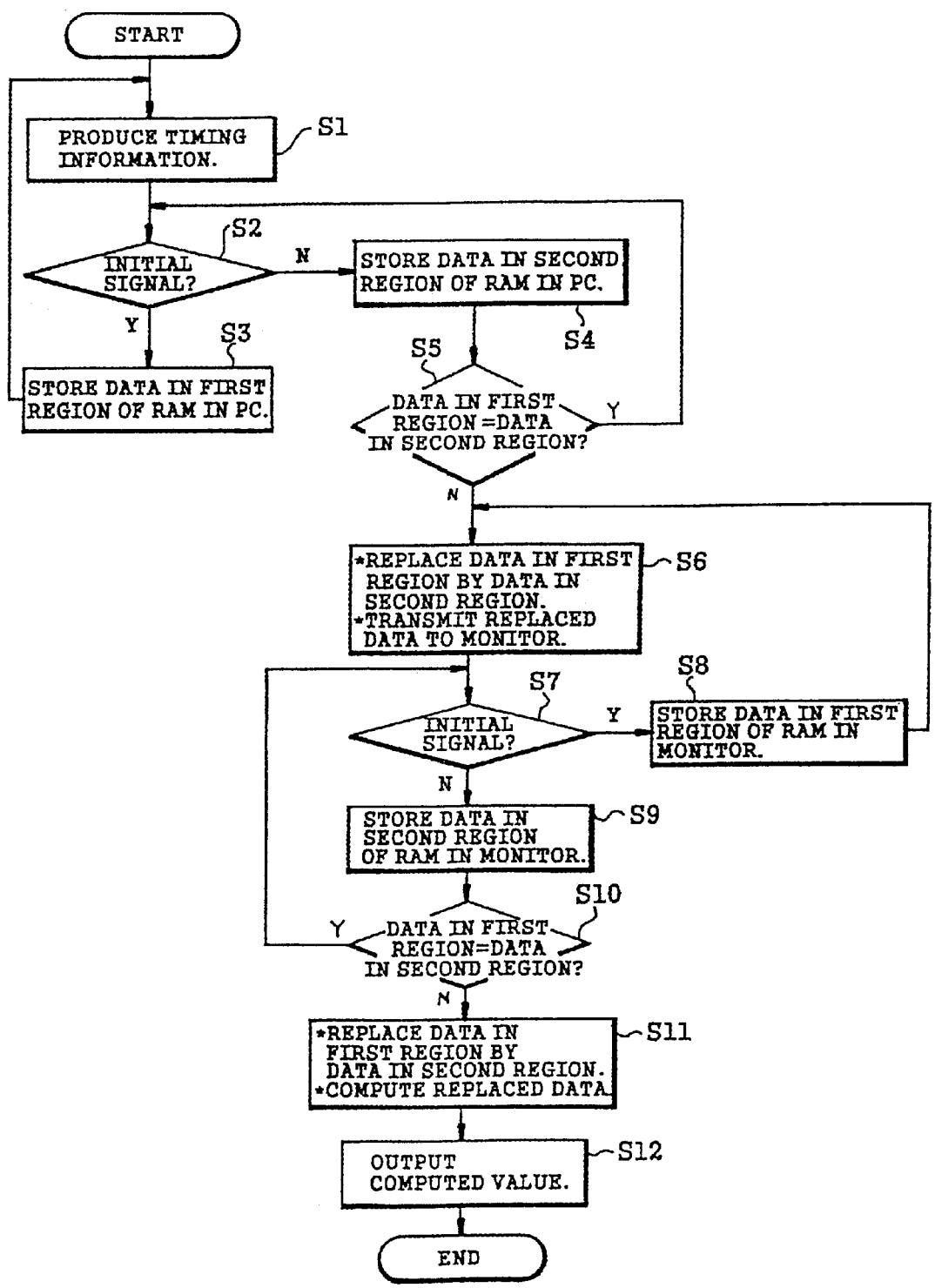
FIG. 5 is a flow chart explaining the picture adjustment performed by the picture adjustment system according to the present invention.
Figure 6A:
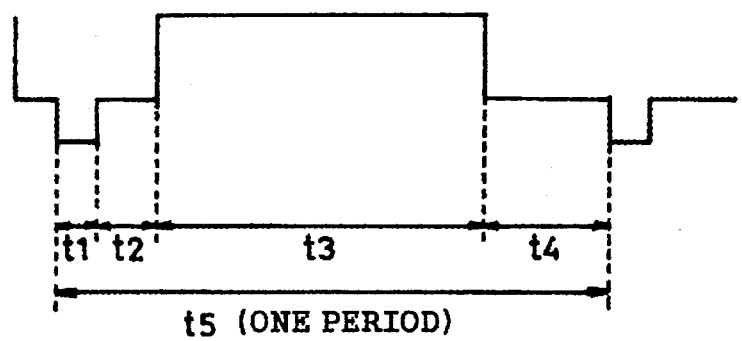
FIG. 6A is a timing chart illustrating timing information to be adjusted by the picture adjustment system according to the present invention.

First, when the monitor 200 is connected to the PC 100, the timing information providing section 5 is driven by the driving section 6, and thus outputs the timing information as shown in FIG. 6A through the I/O section 7 (step S1 of FIG. 5). The timing information of FIG. 6A is composed of a sync signal period t1, a front porch t2, a video signal period t3, and a back porch t4.

The timing information, which is outputted as a digital value, is stored in a random access memory (RAM) (not illustrated) provided in the PC 100. Specifically, if the data value of the timing information is firstly inputted (step S2 of FIG. 5), it is stored in a first region RG1 of the RAM (step S3 of FIG. 5) and is outputted to the monitor 200 through the I/O section 7 as well. Thereafter, if a changed data value of the timing information is inputted, it is stored in a second region RG2 of the RAM (step S4 of FIG. 5) and then is compared with the data value stored in the first region RG1 of the RAM (step S5 of FIG. 5). If the two data values are different from each other as a result of comparison, the data value stored in the first region RG1 of the RAM is replaced by the newly inputted data value, and then the newly inputted data value is outputted to the monitor 200 (step S6 of FIG. 5).

The reason why the data value stored in the first region RG1 of the RAM in the PC 100 is compared with the data value stored in the second region RG2 of the RAM is to provide for the input of any noise component. That is, by comparing the two data values with each other, whether the newly inputted data is normal or not can be judged.

The timing information, being transmitted to the monitor 200 as described above, is stored in a first memory 9, i.e., a RAM provided in the monitor 200. The control section 8 also performs the data comparing process as above with respect to the timing information stored in the first memory 9 to improve the reliability of the information.

Specifically, if the data value of the timing information is firstly inputted (step S7 of FIG. 5), it is stored in a first region RG3 of the RAM 9 (step S8 of FIG. 5). Thereafter, if a changed data value of the timing information is inputted, it is stored in a second region RG4 of RAM 9 (step S9 of FIG. 5). The data value of the timing information stored in the second region RG4 of the RAM 9 is compared with the data value stored in the first region RG3 thereof (step S10 of FIG. 5). If the two values are different from each other as a result of comparison, the data value stored in the first region RG3 is replaced by newly inputted data value stored in the second region RG4, and then the newly inputted data value stored in the second region RG4, and then the newly inputted data value is transferred to the computing section 10 (step S11 of FIG. 5).

The computing section 10, under the control of the control section 8, computes the picture adjustment value utilizing the timing information stored in the memory 9, and provides the computed picture adjustment value to the control section 8 (step S12 of FIG. 5). The control section 8 outputs the inputted picture adjustment value to the signal conversion section 12 through the I/O section 11.

The above described computing process will be explained in detail, taking the adjustment of the horizontal or vertical position of the pictures as an example.

In the timing chart of FIG. 6A, the front porch t2 and the back porch t4, which are placed at both sides of the video signal period t3, respectively, will be the information that determines the horizontal (or vertical) position of the picture. This information value may vary according to the specification of the PC.

For instance, in order to place the video signal period t3 at the center portion of the CRT screen in the event that the data values are t2=2 and t4=4, the data value t2 should be equal to t4. Accordingly, the adjusted front porch t2' and back porch t3' will be t2'=2+1 and t3'=4−1, respectively.

Figure 6B:
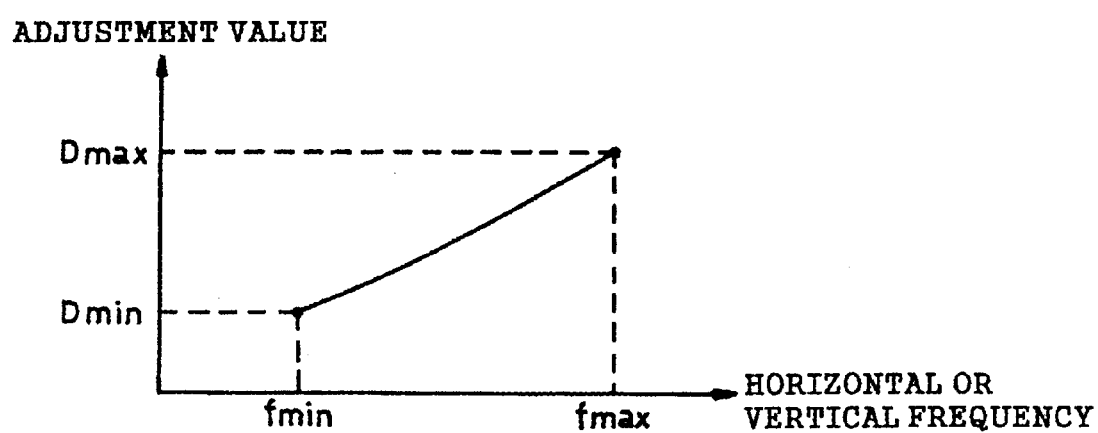
FIG. 6B is a graph illustrating the relationship between the horizontal or vertical frequency and its adjusted value according to the picture adjustment system of the present invention.

Meanwhile, the adjustment of the horizontal or vertical size of the picture, and the compensation for the side pincushion and trapezoidal distortion are performed in such a manner that as the frequency, which varies from the minimum frequency $f_{min}$ to the maximum frequency $f_{max}$, is inputted to the monitor as shown in FIG. 6B, the adjustment value varies within the range of Dmin~Dmax in response to the input frequency.

The data value as adjusted above is then inputted from the control section 8 to the signal conversion section 12 through the I/O section 11, and thus the signal conversion section 12 outputs to the monitor driving section 13 the picture adjustment signal which varies corresponding to the input adjustment value.

The signal conversion section 12, for instance, may comprise a pulse width modulation (PWM) circuit or an analog-to-digital (A/D) converter, which converts the picture adjustment value provided through the I/O section 11 into a DC value to provide the DC value to the monitor driving section 13.

The monitor driving section 13 performs the adjustment of the horizontal or vertical position and size of the picture to be displayed on the CRT screen, and the compensation for the side pincushion and trapezoidal distortion in accordance with the computed picture adjustment value, resulting in that the adjusted picture is displayed on the CRT screen.

On the other hand, if a user, according to his/her preference, inputs a new picture adjustment value such as the value of the horizontal or vertical position or size of the picture, the side pincushion, etc., through the key input section 14, the inputted value is transferred to the control section 8 through the I/O section 11, so that, under the control of the control section 8, the picture adjustment value is computed by the computing section 10, the computed picture adjustment value is converted into a DC picture adjustment signal by the signal conversion section 12, and then the converted picture adjustment signal is transferred to the monitor driving section 13, in the same manner as described above. The picture adjustment value inputted by the user is stored in a second memory 15, i.e., an EEPROM, and thus the picture adjusted according to the user's preference can be displayed on the CRT screen by his/her selection by means of the key input section 14.

As described above, according to the picture adjustment system of the present invention, since the automatic picture adjustment is performed through the communication between the PC and the monitor without a separate adjustment equipment, it is not required to adjust the picture state during the manufacturing process of the monitor, thereby improving the productivity of the monitor. Further, in performing the picture adjustment, the picture adjustment system according to the present invention can automatically recognize the timing information of the PC, which may be different from one another depending on the monitor models or monitor manufacturers, and thus providing convenience in picture adjustment as well as improving the reliability of the product.

While the present invention has been described and illustrated herein with reference to the preferred embodiment thereof, it will be understood by those skilled in the art that various changes in form and details may be made therein without departing from the spirit and scope of the invention.

What is claimed is:

1. An automatic picture adjustment system for adjusting a picture state of a monitor in communication with a personal computer (PC), the system comprising:

means, provided in the PC, for providing timing information for picture adjustment of the monitor;

computation control means, provided in the monitor, for computing a picture adjustment value of the monitor utilizing the timing information provided from the timing information providing means; and conversion driving means, provided in the monitor, for converting the picture adjustment value computed by the computation control means into a picture adjustment signal, and for driving the monitor in accordance with the picture adjustment signal to display on a screen of the monitor a picture adjusted with the picture adjustment value;

wherein the timing information providing means includes a memory having first and second storage regions;

wherein the timing information is stored in the first storage region of the memory, and the following timing information is stored in the second storage region of the memory; and wherein if the two timing information stored in the first and second storage regions are different from each other, the timing information providing means replaces the timing information stored in the first storage region of the memory with the timing information stored in the second storage region of the memory, and provides the replaced timing information in the first storage region of the memory to the computation control means.

2. An automatic picture adjustment system as claimed in claim 1, wherein the memory comprises a RAM.

3. An automatic picture adjustment system for adjusting a picture state of a monitor in communication with a personal computer (PC), the system comprising:

means, provided in the PC, for providing timing information for picture adjustment of the monitor;

computation control means, provided in the monitor, for computing a picture adjustment value of the monitor utilizing the timing information provided from the timing information providing means; and conversion driving means, provided in the monitor, for converting the picture adjustment value computed by the computation control means into a picture adjustment signal, and for driving the monitor in accordance with the picture adjustment signal to display on a screen of the monitor a picture adjusted with the picture adjustment value;

wherein the timing information inputted from the timing information providing means is stored in the first storage region of the memory, and the following timing information is stored in the second storage region of the memory; and wherein if the two timing information stored in the first and second storage regions are different from each other, the computation control means replaces the timing information stored in the first storage region of the memory with the timing information stored in the second storage region of the memory, and provides the replaced timing information in the first storage region of the memory to the conversion driving means.

4. An automatic picture adjustment system for adjusting a picture state of a monitor in communication with a personal computer (PC), the system comprising:

means for providing timing information for picture adjustment of the monitor, including a first memory having first and second storage regions;

wherein the timing information is stored in the first storage region of the first memory, and the following timing information is stored in the second storage region of the first memory; and wherein if the two timing information stored in the first and second storage regions are different from each other, the timing information providing means replaced the timing information stored in the first storage region of the first memory with the timing information stored in the second storage region of the first memory;

computation control means for computing a picture adjustment value of the monitor utilizing the timing information provided from the timing information providing means, the computation control means including a second memory having first and second storage regions wherein the timing information inputted from the timing information providing means is stored in the first storage region of the second memory, and the following timing information is stored in the second region of the second memory; and wherein if the two timing information stored in the first and second storage regions are different from each other, the computation control means replaces the timing information stored in the first storage region of the second memory with the timing information stored in the second storage region of the second memory; and conversion driving means for converting the picture adjustment value computed by the computation control means into a picture adjustment signal, and for driving the monitor in accordance with the picture adjustment signal to display on a screen of the monitor a picture adjusted with the picture adjustment value.

5. An automatic picture adjustment system as claimed in claim 4, further comprising key input means for a user's input of the picture adjustment value according to the user's preference.

6. An automatic picture adjustment system as claimed in claim 4, wherein the picture adjustment of the monitor according to the timing information includes adjustment of horizontal and vertical positions and sizes of the picture, and compensation for a side pincushion and trapezoidal distortion.

7. An automatic picture adjustment system as claimed in claim 4, wherein the timing information is digital information of the picture displayed on the screen of the monitor, and is composed of a sync signal period, a front porch, a video signal period, and a back porch.

8. An automatic picture adjustment system as claimed in claim 5, further comprising a third memory for storing therein the picture adjustment value inputted through the key input means, wherein the picture according to the picture adjustment value stored in the memory is displayed on the screen of the monitor by the user's selection by means of the key input means.

9. An automatic picture adjustment system as claimed in claim 8, wherein the third memory comprises an EEPROM.

10. An automatic picture adjustment system as claimed in claim 4, wherein the first and second memories comprise RAM.

11. A monitor having means for adjusting the picture state of the monitor while in communication with a personal computer (PC), the monitor comprising:

means for providing timing information for picture adjustment of the monitor;

computation control means for computing a picture adjustment value of the monitor utilizing the timing information provided from the timing information providing means, wherein the computation control means includes a memory having first and second storage regions, said timing information is stored in the first storage region of the memory, and following timing information is stored in the second storage region of the memory; and wherein if the two timing information stored in the first and second storage regions are different from each other, the computation control means replaces the timing information stored in the first storage region of the memory with the timing information stored in the second storage region of the memory; and conversion driving means for converting the picture adjustment value computed by the computation control means into a picture adjustment signal, and for driving the monitor in accordance with the picture adjustment signal to display on a screen of the monitor a picture adjusted with the picture adjustment value.

12. A monitor as claimed in claim 11, further comprising key input means for a user's input of the picture adjustment value according to the user's preference.

13. A monitor as claimed in claim 11, wherein the picture adjustment of the monitor according to the timing information includes adjustment of horizontal and vertical positions and sizes of the picture, and compensation for a side pincushion and trapezoidal distortion.

14. A monitor as claimed in claim 11, wherein timing information is digital information of the picture displayed on the screen of the monitor, and is composed of a sync signal period, a front porch, a video signal period, and a back porch.

15. A monitor as claimed in claim 12, further comprising a second memory for storing therein the picture adjustment value inputted through the key input means, wherein the picture according to the picture adjustment value stored in the second memory is displayed on the screen of the monitor by the user's selection by means of the key input means.

16. A monitor as claimed in claim 15, wherein the second memory comprises an EEPROM.

* * * * *